US011156561B2

(12) United States Patent
Mannhardt et al.

(10) Patent No.: US 11,156,561 B2
(45) Date of Patent: Oct. 26, 2021

(54) DEVICE FOR ANALYZING A PRODUCT TO BE ANALYZED LOCATED IN A PRODUCT SPACE

(71) Applicant: BLUE OCEAN NOVA AG, Eschach (DE)

(72) Inventors: Joachim Mannhardt, Eschach (DE); Armin Lambrecht, March-Hugstetten (DE); Gerd Sulz, Ehrenkirchen (DE)

(73) Assignee: Blue Ocean Nova AG, Eschach (DE)

( * ) Notice: Subject to any disclaimer, the term of this patent is extended or adjusted under 35 U.S.C. 154(b) by 318 days.

(21) Appl. No.: 16/025,520

(22) Filed: Jul. 2, 2018

(65) Prior Publication Data

US 2018/0306726 A1 Oct. 25, 2018

Related U.S. Application Data

(63) Continuation of application No. PCT/EP2016/082520, filed on Dec. 23, 2016.

(30) Foreign Application Priority Data

Dec. 30, 2015 (DE) .......................... 102015122995.1

(51) Int. Cl.
*G01N 21/85* (2006.01)
*G01N 21/3577* (2014.01)
*G01N 21/552* (2014.01)

(52) U.S. Cl.
CPC ..... *G01N 21/8507* (2013.01); *G01N 21/3577* (2013.01); *G01N 21/552* (2013.01); *G01N 2021/8528* (2013.01)

(58) Field of Classification Search
CPC ............. G01N 21/8507; G01N 21/552; G01N 21/3577; G01N 21/8528
See application file for complete search history.

(56) References Cited

U.S. PATENT DOCUMENTS 5,051,551 A * 9/1991 Doyle ................. G01N 21/552
250/341.2
5,170,056 A * 12/1992 Berard ................. G01N 21/552
250/339.11
(Continued)

FOREIGN PATENT DOCUMENTS

CN 101228433 A 7/2008
DE 202005011177 U1 11/2006
(Continued)

OTHER PUBLICATIONS

International Search Report dated Apr. 10, 2017 in corresponding application PCT/EP2016/082520.
(Continued)

*Primary Examiner* — Sang H Nguyen
(74) *Attorney, Agent, or Firm* — Muncy, Geissler, Olds & Lowe, P.C.

(57) ABSTRACT

A device for analysing a product to be analysed which is located in a product space having a probe body arranged in a probe housing and having a peripheral wall, and at least one radiation source and at least one optical receiver. At least one measurement window in the probe body has an entry region and an exit region for measurement radiation. An evaluation unit is also provided. The probe body can be brought into a measurement position, in which at least one part of the probe body in which the measurement window is located penetrates through an opening of the probe housing into the product space for the analysis. In addition, the probe body can be brought into a retracted position, in which the probe body is still located at least partially in the region of the opening of the probe housing and thus covers the opening.

20 Claims, 6 Drawing Sheets

(56) References Cited

U.S. PATENT DOCUMENTS

| | | | | |
|---|---|---|---|---|
| 5,569,921 | A * | 10/1996 | Sato | G01N 21/552 250/339.01 |
| 5,585,634 | A * | 12/1996 | Stevenson | G01N 21/431 250/339.11 |
| 5,773,825 | A * | 6/1998 | Doyle | G01N 21/552 250/339.11 |
| 5,835,231 | A | 11/1998 | Pipino | |
| 6,466,323 | B1 | 10/2002 | Anderson et al. | |
| 7,869,028 | B2 * | 1/2011 | Mannhardt | G01N 21/8507 356/246 |
| 8,872,117 | B2 * | 10/2014 | Lendl | G01N 21/15 250/370.08 |
| 9,599,557 | B2 * | 3/2017 | Gigler | G01N 21/15 |
| 10,153,502 | B2 * | 12/2018 | Pijpers | H01M 8/04477 |
| 2002/0125589 | A1 * | 9/2002 | Katzir | G01N 21/552 264/1.23 |
| 2002/0190213 | A1 * | 12/2002 | Bynum | G01N 21/552 250/341.8 |
| 2003/0222380 | A1 * | 12/2003 | Katzir | G01N 21/552 264/667 |
| 2004/0105607 | A1 * | 6/2004 | Cardenas-Valencia | G01N 21/431 385/12 |
| 2005/0219541 | A1 * | 10/2005 | Johnson | G01N 21/8507 356/436 |
| 2007/0224853 | A1 * | 9/2007 | Mannhardt | G01N 21/15 439/77 |
| 2008/0283756 | A1 | 11/2008 | Thomson | |
| 2009/0216464 | A1 | 8/2009 | Kong et al. | |
| 2009/0263070 | A1 * | 10/2009 | Mikkelsen | G01N 21/552 385/12 |
| 2016/0025617 | A1 | 1/2016 | Magnussen et al. | |
| 2016/0076997 | A1 * | 3/2016 | Koerner | A61B 10/0266 250/339.07 |
| 2016/0116407 | A1 * | 4/2016 | Ben-Zion | G01N 21/8507 250/227.11 |
| 2016/0299063 | A1 | 10/2016 | Ebisawa | |

FOREIGN PATENT DOCUMENTS

| | | |
|---|---|---|
| DE | 112014004680 T5 | 6/2016 |
| JP | H11241991 A | 9/1999 |
| WO | WO0201202 A1 | 1/2002 |
| WO | WO0201203 A1 | 1/2002 |
| WO | WO2007009522 A1 | 1/2007 |
| WO | WO2014111498 A1 | 7/2014 |
| WO | WO2015052893 A1 | 3/2017 |

OTHER PUBLICATIONS

International Preliminary Report on Patentability dated Jul. 3, 2018 in corresponding application PCT/EP2016/082520.
Examination Report dated Oct. 13, 2016 by the German Patent Office in corresponding application DE102015122995.1.

* cited by examiner

DEVICE FOR ANALYZING A PRODUCT TO BE ANALYZED LOCATED IN A PRODUCT SPACE

This nonprovisional application is a continuation of International Application No. PCT/EP2016/082520, which was filed on Dec. 23, 2016, and which claims priority to German Patent Application No. 10 2015 122 995.1, which was filed in Germany on Dec. 30, 2015, and which are both herein incorporated by reference.

BACKGROUND OF THE INVENTION

Field of the Invention

The present invention relates to a device for analyzing a product to be analyzed that is located in a product space.

Description of the Background Art

To increase the flexibility and efficiency of industrial production processes, a comprehensive understanding of processes is necessary. Sensors providing information about material compositions, process parameters, reaction processes and product qualities are required.

Distinct advantages are provided here by optical spectroscopic sensors, which function without media contact. The most commonly used technique is spectroscopy in the near-infrared region (NIR) within the wavelength range of 0.8-2.5 µm. An extension of such spectroscopic analysis methods into the mid-infrared region (MIR) with wavelengths of 3-30 µm provides high sensitivity and selectivity. Liquid water in particular and thus all aqueous solutions absorb very strongly in the MIR region, meaning that very small layer thicknesses less than 100 µm must be used for transmission measurements. A promising method that is already known is the use of attenuated total reflection, or ATR for short.

The ATR analysis method is already widespread for testing liquids and solids in process analytics. This means that it is possible to test strongly absorbing samples spectroscopically. The customary arrangement of a so-called ATR probe is formed of an ATR crystal with planar interfaces, of which at least one is contacted with the medium to be analyzed. An electromagnetic wave totally reflected inside the crystal at the interface to the medium is attenuated owing to the interaction of its evanescent field with the medium to be analyzed in the outer region of the crystal. What can then be analyzed is the possibly spectrally resolved degree of attenuation, which is linked to the material properties of the medium to be analyzed. In the case of customary ATR instruments in the UV to MIR radiation range, light sources with a broad spectral band are predominantly used. Here, detection is achieved using spectrometers or individual detectors with spectral filters.

In ATR spectroscopy, the penetration depth of the evanescent wave into the medium is only about one wavelength. In other words, in the NIR region, only a layer thickness of distinctly less than 1 µm is analyzed using ATR technology, whereas several micrometers can be reached with MIR spectroscopy owing to the larger wavelength of several micrometers. In general, contaminants on the surface is a certain problem in ATR spectroscopy, irrespective of the stated spectral region. Coverings on the surface result in the sensor becoming "blind". An ATR spectrometer or ATR photometer must therefore always have clean and easily cleanable surfaces.

Customary ATR arrangements use crystals having planar surfaces, such as prisms for example, as ATR elements. A particular challenge is the integration of such prisms or even plates in process probes. The probe bodies are usually designed with a cylindrical probe shaft for introduction into a reactor or a pipeline via an opening as a flange. The ATR elements are then situated either at the tip of the probe shaft or on the longitudinal side. In the case of an ATR element at the tip, the number of reflections and thus the sensitivity is, however, limited.

The international published specification WO 2015/052893 A1 shows an arrangement in which the light is coupled into a cylindrical ATR element from the end faces of the cylinder and passes through the ATR element longitudinally in a spiral manner. However, the incorporation of the ATR element in holders gives rise to edges and projections on which deposits can form. Cleaning the edges and projections with cleaning liquids, with hot steam or mechanical means is then accordingly complicated.

Furthermore, the publication WO 2007/009522 A1 from the area of NIR process spectroscopy discloses an arrangement for reflection measurement. In operation, light is guided into the process medium laterally to the probe body through a window and the back-scattered or reflected light is likewise laterally detected. The described arrangement can be cleaned very easily.

SUMMARY OF THE INVENTION

It is therefore an object of the present invention to provide a device which can be used optimally for analysis and allows simple cleaning.

An exemplary embodiment of the invention provides a device for the analysis of a product to be analyzed that is situated in a product space, comprising a probe body with a circumferential wall that is arranged in a probe housing, comprising at least one radiation source and at least one optical receiver, comprising at least one measurement window in the probe body with an entrance region and an exit region for measurement radiation, and comprising an evaluation unit. The probe body can be brought to a measurement position at which at least one part of the probe body in which the measurement window is situated plunges through an opening of the probe housing into the product space for analysis. Furthermore, the probe body can be brought to a retracted position at which the probe body is at least still partly situated in the region of the opening of the probe housing and covers the opening at the same time. According to the achievement according to the invention, the at least one measurement window is an ATR element, the ATR element being arranged in at least one subregion of the circumferential wall of the probe body in the beam path.

The invention consequently provides an analysis device which can be used to test products of differing nature that are primarily situated on the outer side of the probe body.

Here, one or more ATR elements can be constructively adapted to the geometry of the probe body. If the probe body has substantially a hollow-cylinder geometry in the region of the at least one ATR measurement window, an ATR element is adapted to the specified conditions and integrated in the probe body without protruding edges. As a result, the probe body is realized in a particularly compact manner and thus, in particular, in an easily cleanable manner.

In principle, testing of a medium to be analyzed on the inner side of the probe body is also envisaged. In the case of such use as pipe probe, process medium flows though the inside of the probe. Owing to the smooth inner surfaces, it is possible for chemomechanical cleaning to be carried out here like in other parts of the process plant without removing parts of the analysis probe.

The measurement radiation used can arrive at the ATR element by means of suitable optical aids, for example prisms or mirrors. In one configuration of the invention, the measurement radiation used for analysis can also be guided to the ATR element by means of transmission and receiving light guides and, from there, to the optical receiver. The measurement radiation enters the ATR element such that it is totally reflected within the ATR element and, in this way, passes inside through the ATR element in order to interact via its evanescent field with the product to be analyzed. The measurement radiation resulting from the ATR element due to interaction is, for example, guided back to the optical receiver by means of a receiving light guide and further processed by the evaluation unit. Here, a high number of reflections of the measurement radiation in the ATR element achieves a correspondingly high sensitivity of the arrangement.

In the measurement position, the probe body can plunge, at least in part with the ATR element as measurement window, through an opening of the probe housing into the product space for analysis. In the case of suitably curved embodiments of the ATR element, it is, for example, possible to achieve a high number of reflections in a small space via the whispering gallery effect in order to boost the measurement signal. The probe body can be introduced into the process via the opening as an access flange and thus has contact with the process medium on the outer side.

Once the probe body is situated in a retracted position at which it is at least still partly situated in the region of the opening of the probe housing, but the ATR element is arranged outside the product space, said ATR element can be cleaned easily. Options for the cleaning procedure are, for example, already described in WO 2007/009522 A1, which corresponds to U.S. Pat. No. 7,869,028, which is incorporated herein by reference.

Suitable materials for ATR elements are, for example, sapphire, Ge, ZnSe, ZnS, CaF2, $BaF_2$, chalcogenide glasses or diamond. As ATR element for the MIR spectral region, preference is given to using the material sapphire, which has an excellent process reliability, up to a wavelength of about 5 µm. For larger wavelengths, it is possible to use materials such as germanium, ZnSe, ZnS, $CaF_2$, $BaF_2$, chalcogenide glasses or diamond. The probe body can, for example, be formed of stainless steel. Hard materials, such as, for example, diamond or diamond-like carbon, can also be taken into consideration as surface coatings. In particular, at least where the surface of the probe body comes into contact with the product to be analyzed. This serves to increase the abrasion resistance, both in the cleaning process and when plunging the probe body into firm substances.

An advantage of the invention is that the constructive solution of the probe body is realized in a favorable manner, both for optical considerations and for fluidic considerations with regard to possible soiling and cleanability of the probe body. As a result of the integration of an ATR element fitted geometrically into the probe body without corners and edges, it is possible for cleaning to be carried out easily. In addition, there is good flow around the probe surface when process media are moved, and, as a result, a rapid material exchange on the surface is ensured.

For instance, the analysis device according to the invention is particularly suitable for in-line process analytics in the chemical and pharmaceutical industry and in the food industry, for example for the determination of the alcohol or sugar content in beverages or of the composition of cooking oils and fats. Similarly, the analysis device is suited to analyses in the area of the petrochemical and oil industry for the determination of the composition and aging of fuels and lubricants. Usage in biotechnology can serve for the monitoring of biogas reactors in fermentation processes. The improved process analytics according to the invention allow higher plant efficiencies and consistently higher product qualities.

In an advantageous configuration of the invention, the ATR element can be designed as a hollow cylinder or hollow sphere. Thus, the measurement radiation in the ATR cylinder can be guided over the circumference by multiple reflections. The coupling-in and coupling-out of light is preferably achieved on the inner side of the hollow cylinder or the hollow sphere or from the end faces of the hollow cylinder or the hollow sphere. A configuration as hollow-cylinder segment or as hollow-sphere segment is conceivable too.

Here, it is possible in particular to fit a cylindrical ATR element without edges in a smooth manner into an often likewise cylindrical probe body of a process probe. The cylindrical arrangement allows, firstly, a good flow around the sensitive surface during the process and also an efficient cleaning. Secondly, the stated geometries can achieve a high number of reflections and thus a high sensitivity.

In a further variant of the invention, the entrance region and/or exit region of the measurement radiation can, in the case of a cylindrical ATR element, be designed such that the measurement radiation in the ATR element is guided in a spiral and circumferential manner to the exit region. Owing to a spiral light propagation, it is possible to further extend the light path. The number of reflections is specified, firstly, by the height of the cylinder element and, secondly, by the slope of a screw thread.

Alternatively, the entrance region and/or exit region of the measurement radiation can advantageously, in the case of a cylindrical ATR element, be designed such that the measurement radiation in the ATR element is guided in a circular and circumferential manner to the exit region. In this embodiment, the coupling-in of light can, in addition to further embodiments, also be advantageously realized by a wedge-shaped notch along the inner side of the cylinder or by lattice structures in the longitudinal direction. In this arrangement, a good illumination of the cylinder is possible from the inner side of the cylinder via cylinder optics for the coupling-in and coupling-out of light.

In a further advantageous configuration of the invention, multiple ATR elements arranged with distribution over the circumferential wall of the probe body can be provided. Multiple ATR elements can be developed in various ways and, for example, combined with other optical measurement methods.

In a further additional embodiment, the at least one ATR element can be designed as a cylinder segment. Also possible are arrangements comprising more than two longitudinal cylinder segments. A cylinder segment can be fitted optimally into a likewise cylindrical probe body. If the coupling-in elements for the measurement radiation are realized as grooves or other notches or else as coupling-in lattices in the ATR element, there are no projecting corners or edges in the coupling-in and coupling-out region.

Advantageously, the at least one ATR element can be designed as a half shell. In a preferred embodiment, two cylinder shells are used instead of a continuous cylindrical ATR element in the form of a pipe. The coupling-in of the light can be realized in this case either from the end face or from the longitudinal side through appropriate abrasion or via lattice couplers. In an ATR element, the coupling-in of light and coupling-out of light can, for example, also be realized in every embodiment by tapered abrasion on the end faces of the pipe.

For example, the at least one ATR element can be flush with the outer side of the circumferential wall of the probe body. This makes it possible to easily clean any possible soiling on the outer side.

The at least one ATR element can, apart from the entrance region and/or exit region of the measurement radiation, be flush with the inner side of the circumferential wall of the probe body. In the case of specific probe types, there can be, on the inner side too, soiled inner surfaces which must be cleaned. Moreover, owing to smooth inner surfaces, the structural space is better accessible for beam-guiding elements.

Advantageously, the entrance region and/or exit region of the measurement radiation of an ATR element can be designed such that the measurement radiation in the ATR element is guided to the exit region in parallel to the longitudinal axis. Self-evidently, the measurement beam in the ATR element is reflected multiple times and, as a result, also runs in a zigzag manner. A parallel guidance of the measurement radiation relative to the longitudinal axis of an ATR element forms the basis of an axis-parallel linear propagation from the entrance region right up to the exit region.

The entrance region and/or exit region of the measurement radiation of the ATR element can be designed as a lattice coupler and/or as a prism coupler. In ATR technology, it is consequently possible to conceive not only prism coupling, but also lattice coupling. Lattice coupling can be realized on the inner side or outer side of the ATR element by the introduction of usually annular lattice structures. Said lattice structures on the inner side of the ATR element can also be structured through the wall of the ATR cylinder, for example via a chemical etching process, mechanically, or by a laser process.

Furthermore, the entrance region and/or exit region of the measurement radiation of the ATR element can preferably be designed as a notch or in a tapered realization on the inner side of the ATR element. As a result, no projecting corners or edges are generated, especially on the inner surface of a probe housing in the transition region of the ATR element.

Advantageously, the at least one ATR element can be usable for the coupling-in and coupling-out of further optical measurement arrangements. Here, with exposure and detection from the inner side, the ATR measurement method can be combined with reflection spectroscopy or other spectroscopy methods in the same measurement probe, with, for example, a hollow cylinder or a segment also serving as optical element for these methods. What are particularly advantageous are embodiments which provide not only the coupling-in and coupling-out of light for the ATR element, but also light sources and detection mechanisms for optical imaging, reflection, scattering and/or Raman spectroscopy measurements. These measurements can be carried out simultaneously with the ATR measurement.

For example, a UV/VIS/NIR or MIR reflection measurement or a scattered-light measurement can be carried out simultaneously or alternatingly with the ATR measurement. Said measurement can either be done with the same light source or be run with an entirely different light source. In the case of radiation through the ATR element in the perpendicular direction, it is possible to easily identify soilings on the surface of the cylindrical material. This means that it is possible to ascertain a reliable and accurate value for the functionality of the probe. In the case of use of an imaging method, for example with a CCD camera, it is possible to provide information about inhomogeneous distributions in the liquid process medium or about coverings on the ATR element in relation to gas bubbles or particles, which can be correlated with the ATR measurements. In the case of use of Raman spectroscopy, it is possible to use a laser as light source. Designing the ATR element as cylinder lens can in this case improve the optical collection efficiency, especially for the weak Raman effect.

In this case, the combination of multiple technologies provides information about the composition of a liquid medium, by means of ATR technology, and about the properties of particles or gas bubbles present in the medium, by means of light scattering or diffuse reflection measurement. Beyond this, a check for possible soiling of the ATR surface is also possible, which can, for example, be used to control a cleaning system.

The at least one ATR element can be realized as an imaging optical element for further optical measurement arrangements. The ATR element can in this case also be used as a lens for the other measurement methods, especially for further optical process sensor systems. Advantageously, the ATR element can also be designed in the shape of a lens or torus on the inner side. A lens form of the ATR element can additionally achieve an improvement in sensitivity for these sensor systems.

Furthermore, the at least one ATR element can be at least partly coated with a dielectric layer and/or with a metal layer on the inner side and/or outer side. In this case, one part of the pipe can also be coated with metal to improve coupling-in, in order to serve as reflector.

Because there are devices or components by means of which the measurement radiation can, after exit from the ATR element, be coupled again into said ATR element, it is possible to achieve a contrast enhancement in the measurement. Alternatively or additionally, the area of use of the device according to the invention can be extended in that there are devices or components for the simultaneous coupling-in of measurement radiation into the ATR element at different points.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
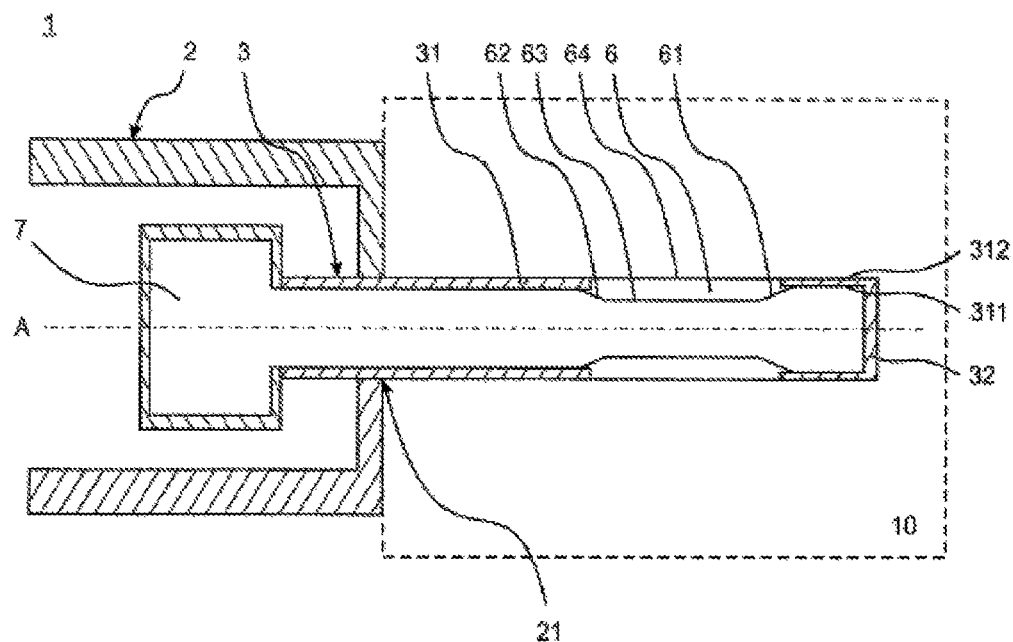
FIG. 1 shows schematically a longitudinal section of an analysis device according to the invention with cylindrical ATR element.

FIG. 1 shows schematically a longitudinal section of an analysis device 1 according to an exemplary embodiment of the invention as process probe with cylindrical ATR element 6. The analysis device 1 has a probe housing 2 having an opening 21 in which a probe body 3 is positioned. Fitted in the circumferential wall of the probe body 31 is an ATR element 6 as measurement window. In this embodiment, the ATR element 6 is a hollow cylinder having an entrance region 61 and an exit region 62 for the measurement radiation. The inner side 63 and the outer side 64 of the ATR element 6 guide the measurement radiation by total reflection from the entrance region 61 to the exit region 62. The outer side 64 of the ATR element 6 aligns with the outer side of the circumferential wall 312 of the probe body 3. Owing to a tapered realization of the entrance region 61 and of an exit region 62 of the ATR element 6, the inner side 63 is somewhat elevated with respect to the inner side of the circumferential wall 311 of the probe body 3. The product space 10 contains the product in fluid or solid form that is intended for analysis.

For simplification of the representation, FIG. 1 does not depict the radiation source and the optical receiver 5. However, in practice, these components are preferably situated at a suitable location within the probe body 3 and the evaluation unit 7. The coupling-in of the measurement radiation into the ATR element 6 and the coupling-out can be achieved with specific light guides or with light sources and receivers near the ATR element 6. These are then preferably attached on appropriate temperature-adjusted holders. Cooling rods can, for example inside the probe body, be guide forward from the outer housing. Possibly situated in the end cap 32 is, for example, a temperature sensor for the media temperature. The media temperature is used for the evaluation of the ATR spectra. The temperature of the cap 32 and of the ATR element 6 can be up to 200° C. The probe body 3 in the region of the evaluation unit 7 with the electronics has virtually ambient temperature.

The light can be coupled either into the entire cylinder or into a segment of the cylinder and coupled out. A homogeneous coupling-in and coupling-out over the entire circumference of the cylinder is possible, for example with the aid of so-called Schwarzschild or Cassegrain optics or via IR LED ring illuminations from the inner side.

Figure 2:
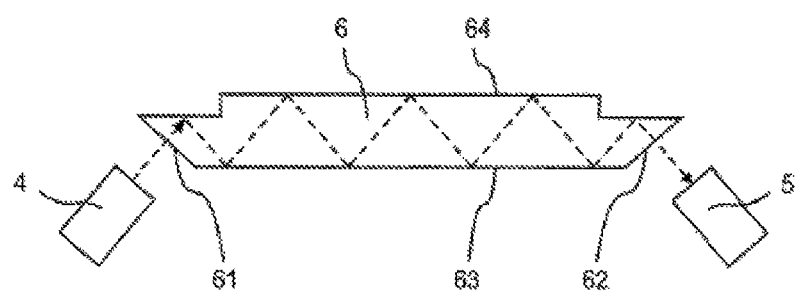
FIG. 2 shows schematically a transverse section of a cylindrical ATR element with the coupling-in and coupling-out of the measurement radiation via end faces beveled in a tapered manner.

FIG. 2 shows schematically a transverse section of a cylindrical ATR element 6 with the coupling-in and coupling-out of the measurement radiation. Here, the end faces of the entrance region 61 and the exit region 62 for the measurement radiation are beveled in a tapered manner. Starting from the radiation source 4, the measurement radiation is guided between the inner side 63 and the outer side 64 of the ATR element 6 by total reflection to the optical receiver 5, where it is detected. Externally, the cylindrical ATR element, for example composed of sapphire, is provided above and below with a phase, by means of which the element can, for example, be soldered into a stainless-steel shaft of a probe body 3 without protruding edges.

Figure 3:
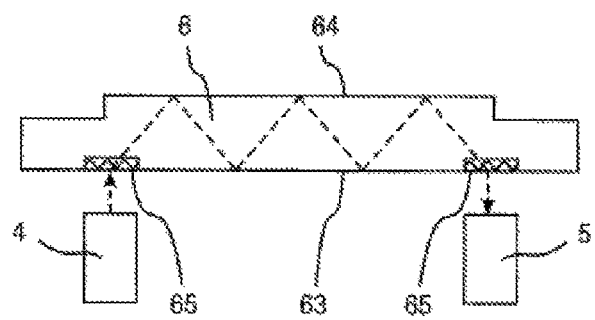
FIG. 3 shows schematically the coupling-in into an ATR element and the coupling-out via lattice couplers on the inner side of an ATR element.

FIG. 3 shows schematically the coupling-in of the measurement radiation into an ATR element 6 and the coupling-out via lattice couplers 65 on the inner side 63 of an ATR element 6. The beam guidance from the radiation source 4 into the ATR element 6 and from the ATR element 6 to the optical receiver 5 can, in this case, be achieved perpendicularly to the surface on the inner side 63.

Figure 4:
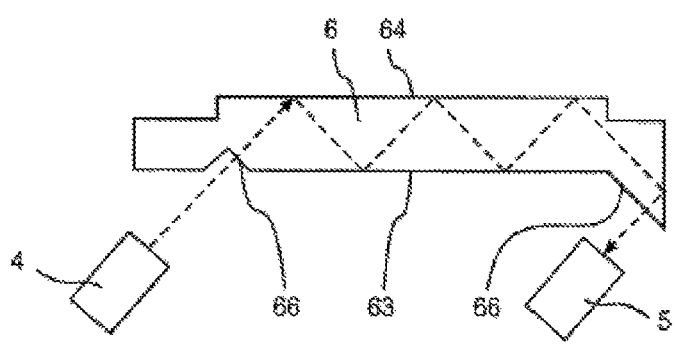
FIG. 4 shows schematically the coupling-in into a cylindrical ATR element via an annular notch and coupling-out via a tapered realization on the inner side of the cylinder.

FIG. 4 shows schematically the coupling-in into a cylindrical ATR element 6 via an annular notch of a prism coupler 66. The coupling-out is achieved via a tapered realization of a further prism coupler 66 on the inner side of the cylinder. The passage surfaces for the entry and exit of the measurement radiation into the and from the respective prism couplers 66 are substantially perpendicular to the beam direction. In any case, such that no total reflection can take place there.

Figure 5:
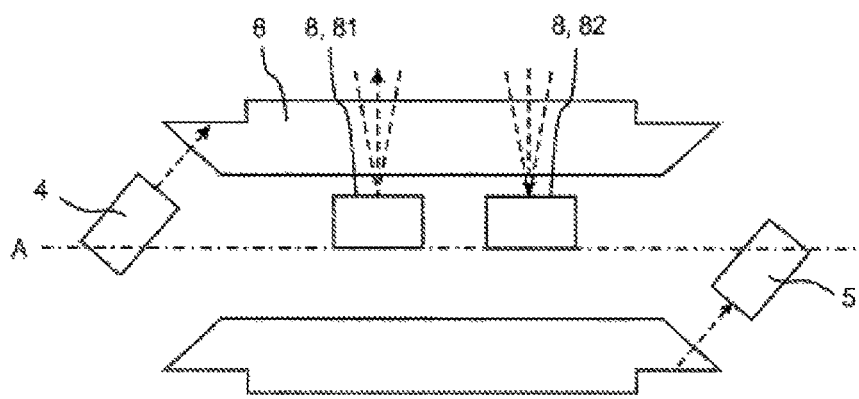
FIG. 5 shows schematically the coupling-in into a cylindrical ATR element and the coupling-out in conjunction with a further optical measurement arrangement.

FIG. 5 shows schematically the coupling-in into a cylindrical ATR element 6 and the coupling-out in conjunction with a further optical measurement arrangement 8. The coupling-in due to the radiation source 4 can take place under a certain angle to the axis A such that what takes place therefrom is a circumferential spiral light propagation in the ATR element 6 until coupling-out into the optical receiver 5. Additionally integrated is a further optical measurement arrangement 8 in the form of a further radiation source 81 and a further receiver 82, for example for spectral reflection scatter measurements. For image recording, the receiver 82 is preferably a CCD, CMOS, InGaAs sensor. For Raman measurements, the radiation source 81 and the receiver 82 can be realized as a laser light source and as a Raman detector element, respectively.

Figure 6:
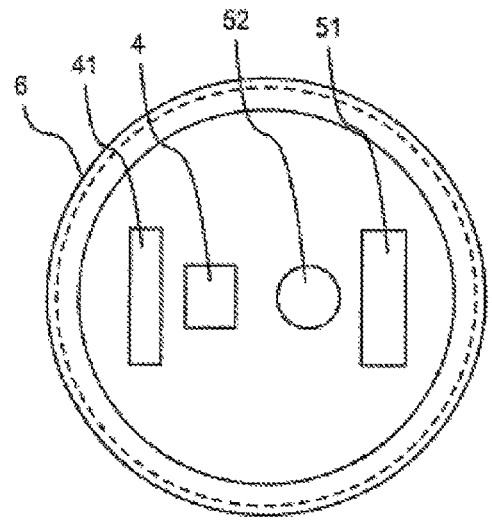
FIG. 6 shows schematically a transverse section through a cylindrical ATR element.

FIG. 6 shows schematically a transverse section through a cylindrical ATR element 6. Schematically indicated are a radiation source 4 and an appropriate coupling-in optics unit 41 and also an optical fiber 52, which can in this case be used for coupling-out of light, and an appropriate coupling-out optics unit 51. In a preferred embodiment, the light from an infrared light source as radiation source 4 is coupled via the coupling-in optics unit 41 from the inner side into the cylindrical ATR element 6. The radiation source 4 can be a broadband thermal emitter, an infrared LED or an infrared laser. After passage through the ATR element 6, the light is detected with a detector element situated on the inner side of the probe body, which detector element is connected operatively to the coupling-out optics unit 51. The detector element can be a broadband detector, for example a thermopile detector, a pyroelectric detector or a semiconductor detector. The detector can be provided with narrowband filters, graduated filters or similar mechanisms for the detection of certain spectral channels. The detector element can also be a spectrometer, for example a micromechanically adjustable Fabry-Perot interferometer. For the coupling-in of the light, there are various options.

In the embodiment according to FIG. 6, the light is preferably guided in the longitudinal direction of the cylindrical ATR element 6 and thus achieves a high number of reflections depending on the height of the cylinder element. However, by means of a spiral light propagation, the light path can also in turn be further extended. The number of reflections is, for a start, limited by the height of the ATR element 6, by the losses due to absorption and by the divergence to the light source or the opening angle of the detector element. However, in the case of an excessively large divergence, only a relatively low number of reflections can be realized.

The light can be fed in with optical fibers on the inner side and, after passage through the ATR element 6, coupled out via optical fibers. The other end of the optical fibers is situated in the evaluation unit 7, depicted in FIG. 1. The optical fibers are preferably guided in the probe body and inside the cylindrical ATR element 6. Here, a cooler can then possibly be omitted.

Figure 7:
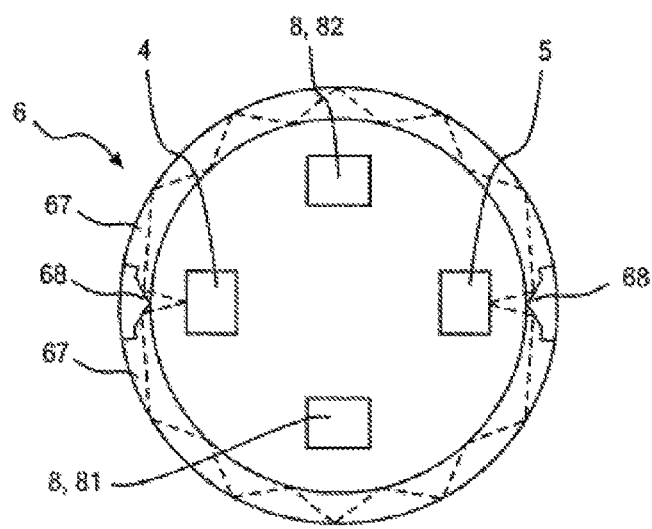
FIG. 7 shows schematically a transverse section through an ATR element comprising two cylinder segments.

FIG. 7 shows schematically a transverse section through an ATR element 6 comprising two cylinder segments 67. In this case, the light propagation passes on the circumference of the cylinder segments 67. Inside the hollow cylinder, various radiation sources 4 and optical receivers 5 for the ATR measurement or else for other optical measurements are drawn in. Mirror surfaces 68 distribute the light to both sides of the cylinder segments 67.

Figure 8:
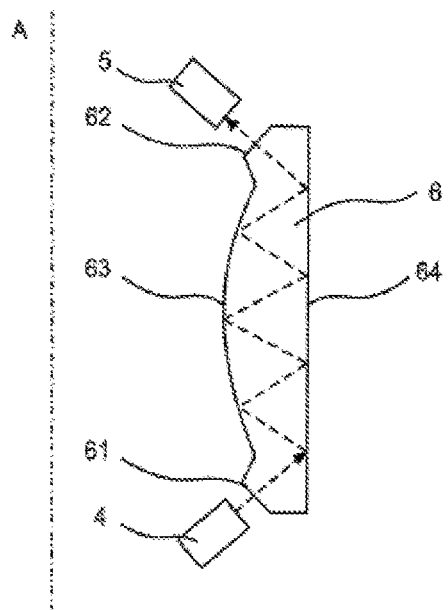
FIG. 8 shows schematically a transverse section through a toroidal ATR element as measurement window.

FIG. 8 shows schematically a transverse section through a toroidal ATR element 6 as measurement window. In this further embodiment, there is a deviation from the cylindrical basic form. Toroidal subsurfaces of the ATR element then have a surface shaped in a bulbous manner. Again, the end faces of the entrance region 61 and the exit region 62 for the measurement radiation are beveled in a tapered manner. Starting from the radiation source 4, the measurement radiation is, despite the curved profile, guided on the inner side 63 by total reflection to the optical receiver 5, where it is detected. In the figures, no divergent light paths are shown for the sake of simplicity. Furthermore, the figure depicts the symmetry axis A, where the parts of the arrangement that are symmetrical with regard to said axis.

Figure 9:
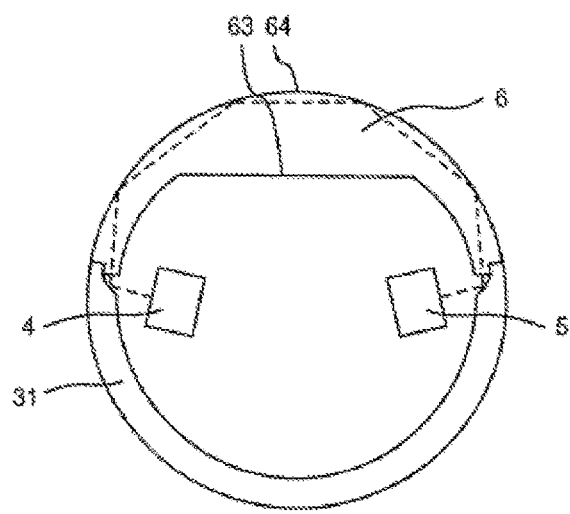
FIG. 9 shows schematically a transverse section through an ATR element with planar cylinder lens as coupling-in and coupling-out element.

FIG. 9 shows schematically a transverse section through an ATR element 6 which is realized regionally as a planar cylinder lens. In this embodiment, the coupling-in of the measurement radiation from the radiation source 4 and also the coupling-out into the optical receiver 5 take place virtually in the radial direction. In this arrangement, it is possible to achieve an optimization of the light guidance in the ATR element 6. A major advantage of these specific forms is that it is possible to use the ATR element 6 as imaging lens element for a further optical sensor system in combination with the ATR measurement technology. To improve reflectivity, especially for incidence angles in the region of the critical angles for total reflection, an ATR element 6 can be coated on the inner side with dielectric layers for the ATR spectral region used or else with metal. As further alternative embodiments for coupling-in in the radial direction, cylinder meniscus lenses or else other lenses are also conceivable. It is self-evident that it is also possible to combine various imaging lens elements in a probe; for example, it is possible, in relation to the planar cylinder lens shown in FIG. 9, to additionally arrange a meniscus lens opposite it.

Figure 10:
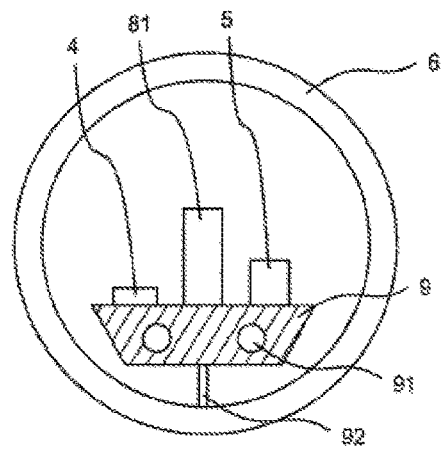
FIG. 10 shows schematically a transverse section of a cylindrical ATR element with cooled radiation sources and a receiver.

FIG. 10 shows schematically a transverse section of a cylindrical ATR element 6 having cooled radiation sources 4, 81 and a receiver 5. If the coupling-in of light is realized with one or more radiation sources 4, 81 near the ATR element 6 and/or if the coupling-out of light is done with an optical receiver 5 as detector element near the ATR element 6, it is optionally possible to provide cooling by means of a cooling mechanism 9. To this end, it is advantageous for the cooling mechanism 9, for example in the form of copper profiles or rods, to be guided along the inner side up to the ATR element 6 and optionally fixed with a spacer 92. Said cooling mechanism 9, with which the light sources and detectors are in good thermal contact, can also be provided with water or air cooling via cooling channels 91.

Figure 11:
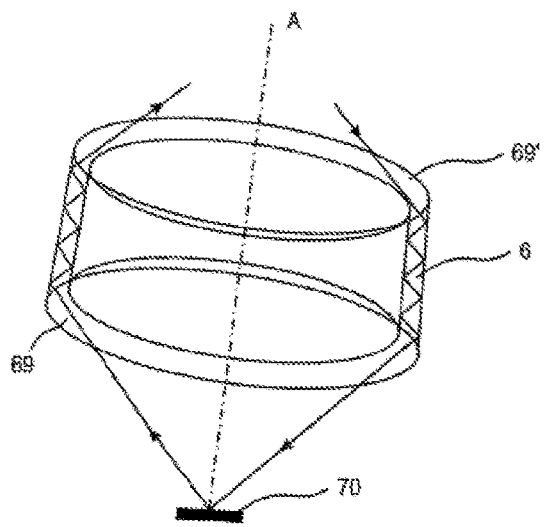
FIG. 11 shows schematically a cylindrical ATR element with double light passage.

FIG. 11 shows schematically a cylindrical ATR element 6 with double light passage in the probe body. The radiation beam proceeding from the radiation source is coupled via the bevel 69 into the hollow-cylinder ATR element 6, where it is totally reflected multiply at the interfaces to the environment in the known manner. Thereafter, the radiation exits from the ATR element through the opposite bevel 69', where it is coupled again on the opposite side, via the mirror 70, into the ATR element 6, where there is again a multiple total reflection at the interfaces until there is exit from the ATR element 6. After the exit of the radiation from the ATR element 6, it is fed to a receiver. The mirror 70 can be designed as a simple mirror or as an imaging mirror for beam correction, especially for refocusing. Alternatively, using the mirror 70, coupling-in of the radiation into a fiber leading back to a detector could also be achieved if a further passage through the ATR element 6 is not possible or desired.

A pivoted or switchable design of the mirror 70 can allow a change in contrast by a factor of two, since this makes it possible to double or halve the number of total reflections of the radiation at the interface of the ATR element 6.

Figure 12:
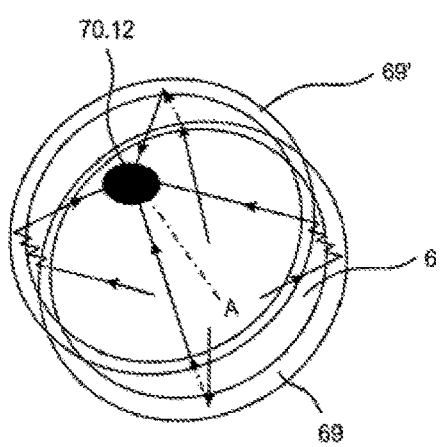
FIG. 12 shows schematically a cylindrical ATR element with a further modified light passage.

FIG. 12 shows a variant further modified with respect to FIG. 11. In this case too, the ATR element 6 is realized as a hollow cylinder with bevels 69 and 69'. In contrast to the arrangement depicted in FIG. 11, the radiation is in this case coupled parallelly or simultaneously at various points via the bevel 69 into the ATR element 6 and reaches the detector 70.12 after exit from the ATR element 6 via the bevel 69'. Instead of the detector 70.12, it is also possible to arrange a mirror, more particularly a collection mirror, in the focus of which a detector element is arranged, or an optical element for beam direction and shaping, for example a mirror or a deflection prism.

The parallelized input radiation shown can be achieved in a wide variety of different ways, especially by means of a faceted, mirrored element, all-round mirror, an arrangement of individual mirrors or the like.

The bevels 69 and 69' depicted in FIGS. 11 and 12 can in particular also be designed to be faceted, i.e. have small planar surfaces for coupling-in and for coupling-out.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for an analysis of a product to be analyzed that is located in a product space, the device comprising:
   a probe body with a circumferential wall that is arranged in a probe housing, the probe body having a first end and a second end;

at least one radiation source;

at least one optical receiver;

at least one measurement window arranged within the circumferential wall with an entrance region and an exit region for measurement radiation, the at least one measurement window being arranged between and spaced from the first end and the second end of the probe body; and an evaluation unit;

wherein, in a measurement position of the probe body, at which at least one part of the probe body in which the measurement window is arranged plunges through an opening of the probe housing into the product space for analysis, and wherein, in a retracted position of the probe body, at which the probe body is at least still partly situated in a region of the opening of the probe housing and covers the opening at the same time, wherein the at least one measurement window is an ATR element, and wherein the ATR element is arranged in at least one subregion of the circumferential wall of the probe body in the beam path.

2. The device as claimed in claim 1, wherein the ATR element is a hollow cylinder or hollow sphere or a hollow-cylinder segment or a hollow-sphere segment.

3. The device as claimed in claim 1, wherein the entrance region and/or exit region of the measurement radiation of an ATR element is designed such that the measurement radiation in the ATR element is guided to the exit region in parallel to the longitudinal axis.

4. The device as claimed in claim 1, wherein the entrance region and/or exit region of the measurement radiation is, in a case of a cylindrical ATR element, designed such that the measurement radiation in the ATR element is guided in a circular and circumferential manner to the exit region.

5. The device as claimed in claim 1, wherein the entrance region and/or exit region of the measurement radiation is, in a case of a cylindrical ATR element, designed such that the measurement radiation in the ATR element is guided in a spiral and circumferential manner to the exit region.

6. The device as claimed in claim 1, further comprising at least two ATR elements arranged over the circumferential wall of the probe body.

7. The device as claimed in claim 1, wherein the at least one ATR element is flush with an outer side of the circumferential wall of the probe body.

8. The device as claimed in claim 1, wherein the at least one ATR element is, apart from the entrance region and/or exit region of the measurement radiation, flush with an inner side of the circumferential wall of the probe body.

9. The device as claimed in claim 1, wherein the entrance region and/or exit region of the measurement radiation of the ATR element is designed as a lattice coupler and/or as a prism coupler.

10. The device as claimed in claim 1, wherein the entrance region and/or exit region of the measurement radiation of the ATR element is designed as a notch or in a tapered realization on the inner side of the ATR element.

11. The device as claimed in claim 1, wherein the at least one ATR element is usable for the coupling-in and coupling-out of further optical measurement arrangements.

12. The device as claimed in claim 11, wherein the at least one ATR element is an imaging optical element for further optical measurement arrangements.

13. The device as claimed in claim 1, wherein the at least one ATR element is at least partly coated with a dielectric layer and/or with a metal layer on the inner side and/or outer side.

14. The device as claimed in claim 1, further comprising a mirror via which the measurement radiation, after exit from the ATR element, is coupled again into the ATR element.

15. The device as claimed in claim 1, further comprising a mirror for the simultaneous coupling-in of the measurement radiation into the ATR element at different points.

16. The device as claimed in claim 1, wherein the circumferential wall has an outer side and an inner side, and
wherein the ATR element is flush with the outer side and protrudes beyond the inner side into the probe body.

17. The device as claimed in claim 1, wherein the ATR element is a hollow, cylindrical elongate element having an entrance region at a first end of the ATR element and an exit region at a second end of the ATR element, the second end being opposite the first end.

18. The device as claimed in claim 17, wherein end faces of the exit region and the entrance region are tapered.

19. A device for an analysis of a product to be analyzed that is located in a product space, the device comprising:
a radiation source;
an optical receiver;
an evaluation unit;
a probe body comprising:
    a first end;
    a second end opposite the first end forming an end cap; and
    a circumferential wall extending between the first end and the second end;
a measurement window arranged within the circumferential wall between the first end and the second end; and
an ATR element disposed within the measurement window.

20. A probe, comprising:
a probe body comprising:
    a first end;
    a second end opposite the first end forming an end cap; and
    a circumferential wall extending between the first end and the second end;
a measurement window arranged within the circumferential wall between the first end and the second end; and
an ATR element disposed within the measurement window.

* * * * *